(12) United States Patent
Ling (10) Patent No.: US 10,310,063 B2
(45) Date of Patent: Jun. 4, 2019

(54) CALIBRATION OF A MULTIFUNCTIONAL AUTOMOTIVE RADAR SYSTEM (71) Applicant: Maxlinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 372 days.

(21) Appl. No.: 15/150,831

(22) Filed: May 10, 2016

(65) Prior Publication Data
US 2016/0334511 A1 Nov. 17, 2016

Related U.S. Application Data (60) Provisional application No. 62/160,015, filed on May 12, 2015.

(51) Int. Cl.
*G01S 13/00* (2006.01)
*G01S 13/02* (2006.01)
*G01S 13/42* (2006.01)
*G01S 13/87* (2006.01)
*G01S 13/93* (2006.01)
(Continued)

(52) U.S. Cl.
CPC ........ *G01S 13/0209* (2013.01); *G01S 13/003* (2013.01); *G01S 13/42* (2013.01); *G01S 13/87* (2013.01); *G01S 13/878* (2013.01); *G01S 13/931* (2013.01); *G01S 7/006* (2013.01); *G01S 13/60* (2013.01); *G01S 13/86* (2013.01); *G01S 13/89* (2013.01); *G01S 2013/9375* (2013.01); *G01S 2013/9378* (2013.01); *G01S 2013/9382* (2013.01); *G01S 2013/9385* (2013.01);
(Continued)

(58) Field of Classification Search
CPC .... G01S 13/0209; G01S 13/003; G01S 13/42; G01S 13/87; G01S 13/878; G01S 13/931; G01S 2013/9392; G01S 2013/9378; G01S 2013/9375; G01S 13/89; G01S 2013/9389; G01S 2013/9382; G01S 13/86; G01S 2013/9385; G01S 13/60; G01S 7/006
USPC ......................................................... 342/21
See application file for complete search history.

(56) References Cited

U.S. PATENT DOCUMENTS 3,725,938 A * 4/1973 Black ................. G01S 1/02
   342/434
8,947,294 B1 * 2/2015 Wasiewicz ......... G01S 7/2813
   342/159
(Continued)

OTHER PUBLICATIONS

Wikipedia article, "Beamforming", Mar. 17, 2016 version (Year: 2016).*

*Primary Examiner* — Frank J McGue
(74) *Attorney, Agent, or Firm* — McAndrews, Held & Malloy, Ltd.

(57) ABSTRACT

A multifunctional radar transmitter may comprise bus interface circuitry and beamforming circuitry. The beamforming circuitry, with use of a plurality of beamforming coefficients, is operable to process a plurality of baseband signals to generate a millimeter wave radar burst corresponding to a radiation pattern that comprises a first lobe and a second lobe, where the first lobe is at a first angle and the second lobe is at a second angle. The bus interface circuitry is operable to receive, from a first receiver, an indication of interference from the second lobe present at the first receiver. The beamforming circuitry is operable to adjust, (Continued)

based on the indication of interference, the beamforming coefficients such that the second lobe is redirected to a third angle.

20 Claims, 10 Drawing Sheets

(51) Int. Cl.
    *G01S 7/00*          (2006.01)
    *G01S 13/60*        (2006.01)
    *G01S 13/86*        (2006.01)
    *G01S 13/89*        (2006.01)

(52) U.S. Cl.
    CPC ............ *G01S 2013/9389* (2013.01); *G01S 2013/9392* (2013.01)

(56) References Cited

U.S. PATENT DOCUMENTS

| | | | | |
|---|---|---|---|---|
| 2011/0109495 A1* | 5/2011 | Takeya | ............... | G01S 13/34 342/107 |
| 2012/0268325 A1* | 10/2012 | Hansen | ............... | G01S 3/32 342/373 |
| 2012/0299773 A1* | 11/2012 | Stirling-Gallacher | ............... | G01S 13/89 342/368 |

\* cited by examiner

CALIBRATION OF A MULTIFUNCTIONAL AUTOMOTIVE RADAR SYSTEM

PRIORITY CLAIM

This application claims priority to the following application(s), each of which is hereby incorporated herein by reference:

U.S. provisional patent application 62/160,015 titled "Calibration of a Multifunctional Automotive Radar System" filed on May 12, 2015.

INCORPORATION BY REFERENCE

The entirety of each of the following applications is hereby incorporated herein by reference:
U.S. provisional patent application 62/155,728 titled "Multistatic Radar via an Array of Multifunctional Automotive Transceivers" filed on May 1, 2015;
U.S. patent application Ser. No. 15/142,926 titled "Multistatic Radar via an Array of Multifunctional Automotive Transceivers" filed on Apr. 29, 2016;
U.S. provisional patent application 62/160,316 titled "Scalable Architecture for an Automotive Radar System" filed on May 12, 2015;
U.S. provisional patent application 62/154,840 titled "Multifunctional Automotive Radar" filed on Apr. 30, 2015;
U.S. patent application Ser. No. 15/142,935 titled "Multifunctional Automotive Radar" filed on Apr. 29, 2016;
U.S. provisional patent application 62/162,206 titled "Dynamic OFDM Symbol Shaping for Radar Applications" filed on May 15, 2015; and
U.S. provisional patent application 62/167,950 titled "Cooperative and Crowd-Sourced Multifunctional Automotive Radar" filed on May 29, 2015.

BACKGROUND

Limitations and disadvantages of conventional automotive radar systems and methods will become apparent to one of skill in the art, through comparison of such approaches with some aspects of the present method and system set forth in the remainder of this disclosure with reference to the drawings.

BRIEF SUMMARY

Methods and systems are provided for calibration of a multifunctional automotive radar system, substantially as illustrated by and/or described in connection with at least one of the figures, as set forth more completely in the claims.

DETAILED DESCRIPTION

Figure 1:
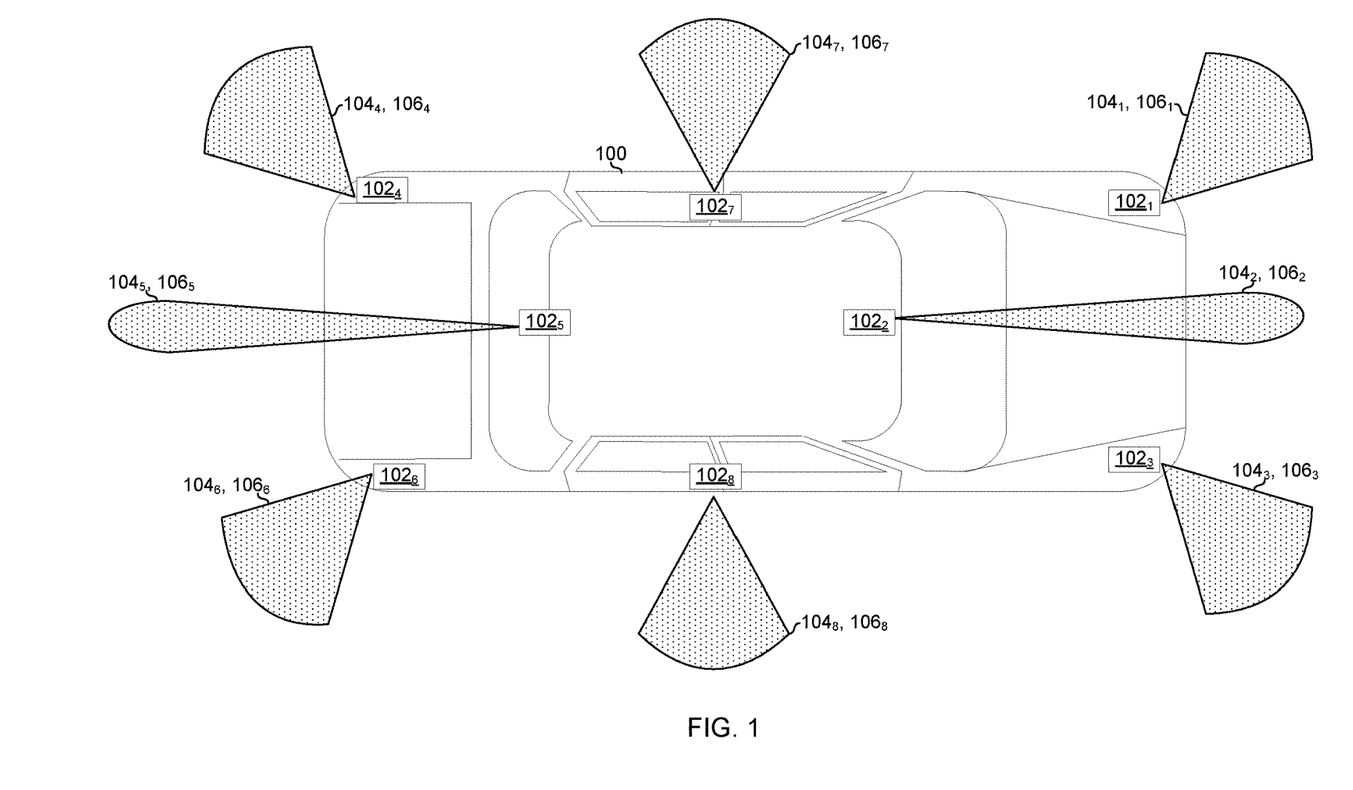
FIG. 1 shows an automobile comprising a plurality of multifunctional radar transceivers.

FIG. 1 shows an automobile comprising a plurality of multifunctional radar transceivers 102 (labeled with subscripts '1' through '8') of an automobile 100. Although the example automobile 100 comprises eight transceivers 102 for illustration, any number may be present. Each multifunctional radar transceiver 102 has a corresponding receive antenna pattern 104 and transmit antenna pattern 106 (for clarity of illustration, the transmit and receive patterns are shown as the same, but they need not be). As discussed in further detail in the remainder of this disclosure, the multifunctional radar transceivers 102 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 100 (the "scene").

The positioning function comprises use of the same millimeter wave signals used for the radar function to improve upon coarse position determined through other mechanisms such as GPS.

The communication function comprises communicating data among the multifunction radar transceivers 102 using the same millimeter wave signals as are used for the radar function. Such data may include, for example, pixel or voxel data (and time and position metadata) generated using the radar and positioning functions.

Through a combination of the radar function, the positioning function, and the communication function, the multifunctional radar transceivers $102_1$-$102_8$ are operable to generate a scene representation (e.g., 2D pixel grid or 3D voxel grid) where the absolute time of capture of the scene representation and the absolute position of the pixels (2D) or voxels (3D) in the scene representation are known.

The circuitry 110 represents other circuitry of the automobile 100 such as one or more transceivers (e.g., cellular, Wi-Fi, Bluetooth, GPS, etc.), instrumentation (e.g., entertainment system, driver indicators/gauges, driver controls), sensors for safety systems, etc. The circuitry 110 may be communicatively coupled to the transceivers 102 via a CAN_bus, for example. The circuitry 110 may be operable to process data from the transceivers and take action (e.g., trigger driver alerts, transmit messages via one or more of its transceivers, trigger braking or other safety systems, etc.) in response to such data. The circuitry 110 may also generate data which it may pass to the transceiver(s) 102 for communication to a remote transceiver 102 (e.g., that is mounted to another automobile and/or to infrastructure such as the road, sign post, stop-light, etc.) In an example implementation, the circuitry 110 may comprise a cell phone that connects to an electronics system of the automobile 100 via USB, Bluetooth, Wi-Fi, or any other suitable interface and then the electronics system 110 of the automobile 100 leverages the cellular transceiver of the circuitry 110 for connecting to a cellular network.

Figure 2A:
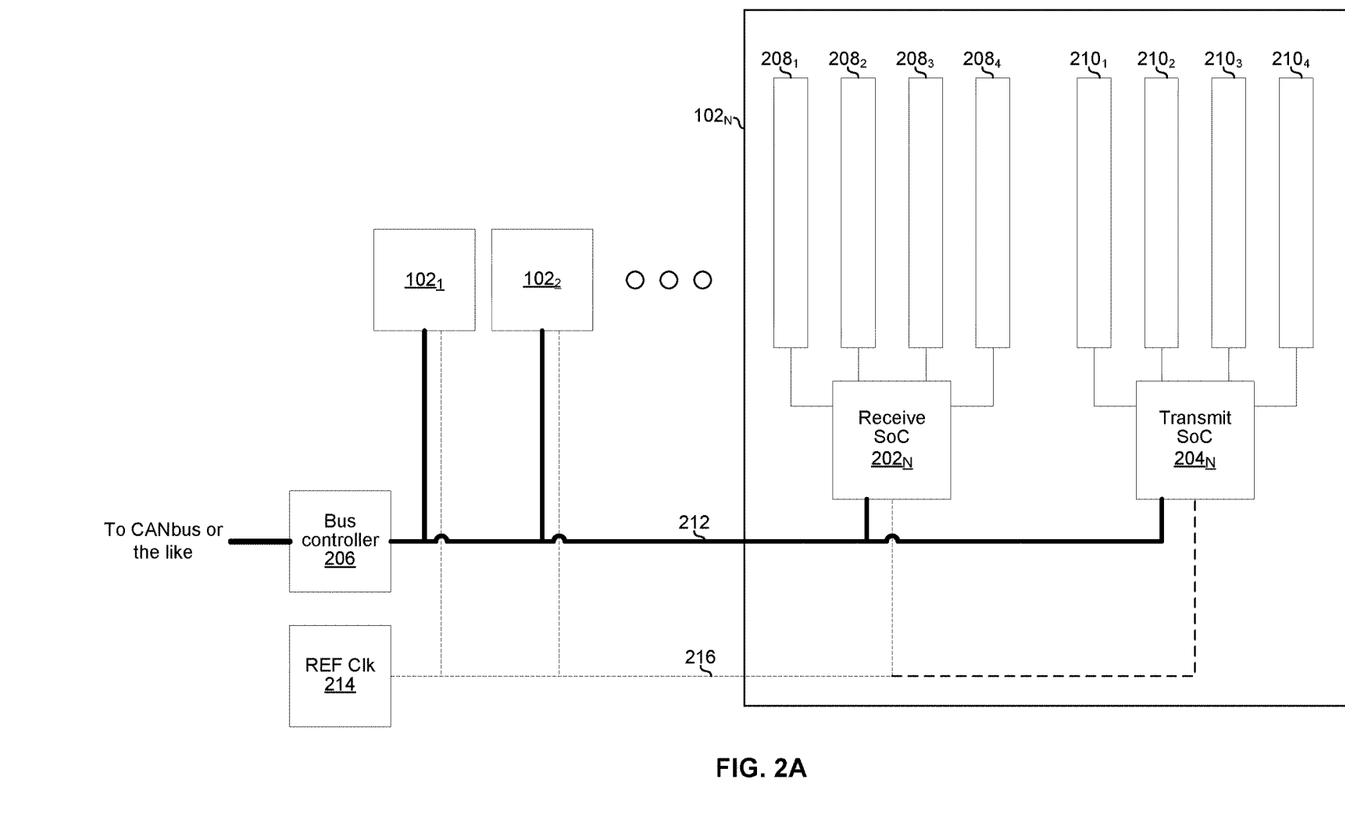
FIG. 2A shows an example architecture of a multifunctional radar system of an automobile.

FIG. 2A shows an example architecture of a multifunctional radar system of an automobile. The example multifunctional radar system 200 comprises N multifunction radar transceivers 102, a bus controller 206, a reference clock generator 214, data bus 212, and clock distribution bus 216. For clarity of illustration, example implementation details are shown for only the $N^{th}$ transceiver ($102_N$), but the other transceivers $102_1$-$102_N$ may be the same. Each multifunctional radar transceiver $102_n$ (the subscript 'n' used here to generically represent each of the transceivers $102_1$-$102_N$ individually) comprises a receive SoC $202_n$, a transmit SoC $204_n$, a plurality of receive antenna elements 208 (labeled with subscripts 1 through 4, where four was chosen arbitrarily for illustration but any number greater than one may be used), and a plurality of transmit antenna elements 210 (labeled with subscripts 1 through 4, where four was chosen arbitrarily for illustration but any number greater than one may be used, and the number of transmit antenna elements need not match the number of receive antenna elements). In an example implementation, each of the multifunctional radar transceivers 102 comprises one or more CMOS dies on a printed circuit board. In an example implementation, each of the receive SoCs $202_N$, the transmit SoC $204_N$, the bus controller 206, and the reference clock generator 214 is a separately packaged CMOS integrated circuit.

Each of the receive antenna elements $208_1$-$208_4$ comprises, for example, a copper microstrip patch antenna on a printed circuit board (e.g., FR4, Duroid, or the like). Although four elements 208 are shown for illustration, any number may be used.

Each receive SoC $202_n$ is operable to receive millimeter wave signals (e.g., in the 76 to 81 GHz band) via the antenna elements $208_1$-$208_4$. The receive SoC $202_n$ is operable to process received millimeter wave signals for supporting the radar, positioning, and communication functions. The receive SoC $202_n$ is also operable to communicate over data bus 212 and to synchronize its timing to a signal output by reference clock 214 onto clock distribution bus 216. Additional details of an example receive SoC $202_n$ are described below with reference to FIG. 2B.

Each of the transmit antenna elements 210 comprises, for example, a copper microstrip patch antenna on a printed circuit board (e.g., FR4, Duroid, or the like). Although four elements 210 are shown for illustration, any number may be used.

The transmit SoC $204_n$ is operable to transmit millimeter wave signals (e.g., in the 76 to 81 GHz band) via the antenna elements $210_1$-$210_4$. The transmit SoC $204_n$ is operable to generate the signals in such a manner as to support the radar, positioning, and communication functions. The transmit SoC $204_n$ is also operable to communicate over data bus 212 and to synchronize its timing to a signal output by reference clock 214 onto clock distribution bus 216. Additional details of an example transmit SoC $204_n$ are described below with reference to FIG. 2C.

The bus controller 206 is operable to relay data between the data bus 212 interconnecting the multifunction radar transceivers $102_1$-$102_N$ and a data bus of the automobile 100 (e.g., a CAN bus). The bus 212 may, for example, be a high speed serial bus and the bus controller 206, receive SoC $202_n$, and transmit SoC $204_n$ may each be operable to perform serialization and deserialization for communicating over the bus 212.

The reference clock generator 214 comprises a crystal oscillator, phase locked loop, and/or other circuitry for generating a signal to act as a phase reference for receive SoC 202, and transmit SoC $204_n$. In an example implementation, the frequency of the reference signal may be relatively low compared to the millimeter wave frequencies (e.g., on the order of tens or hundreds of MHz), which may greatly relax the routing requirements for the bus 216 as compared to trying to distribute a reference signal in the 77 to 81 GHz range. In another example implementation, the frequency of the reference signal may be the same as the millimeter wave carrier frequency (e.g., it the range 77 to 81 GHz).

Figure 2B:
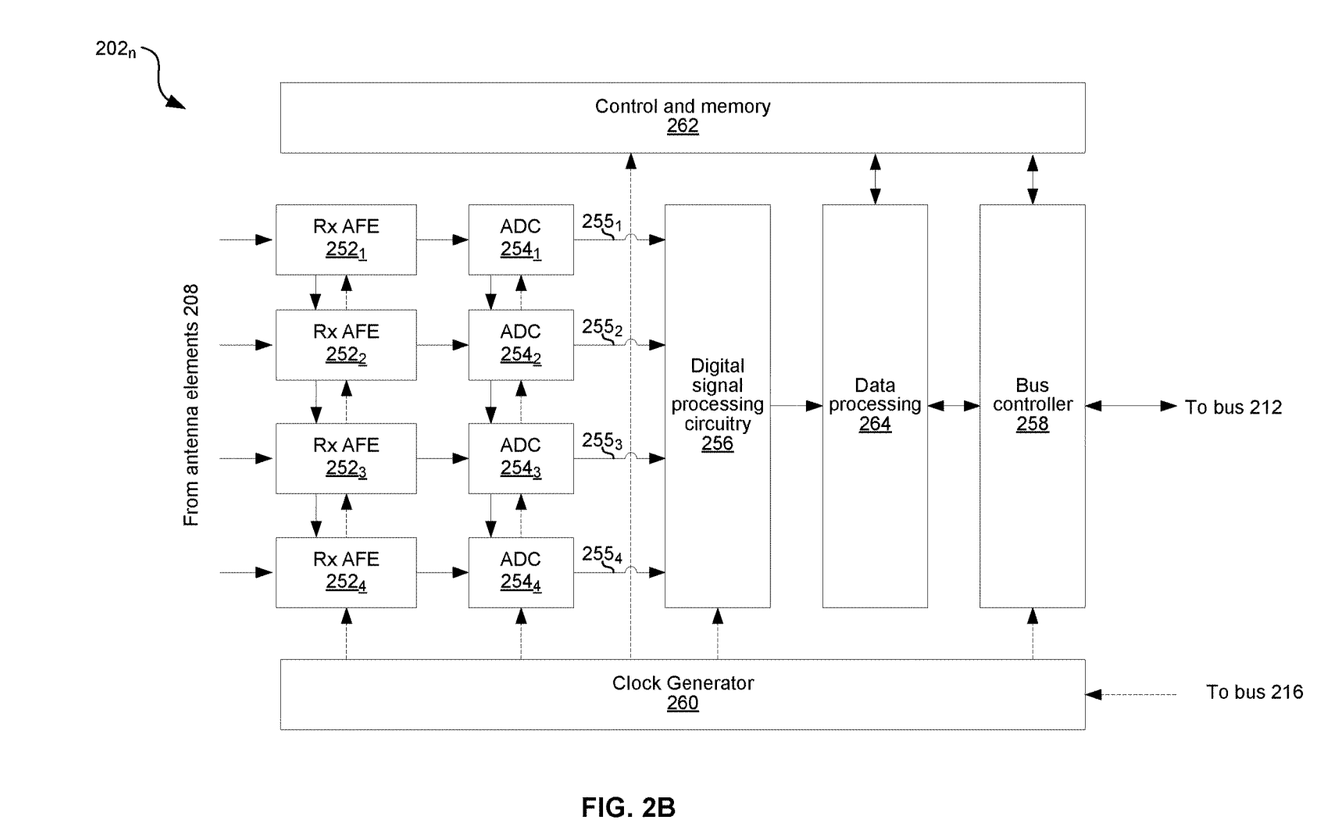
FIG. 2B shows an example implementation of a receiver system on chip (SoC) of a multifunctional radar transceiver of FIG. 2A.

FIG. 2B shows an example implementation of a receiver system on chip (SoC) of the multifunctional radar transceiver of FIG. 2A. The example receive SoC $202_n$ comprises a plurality (a number corresponding to the number of receive antenna elements 208) of receive analog front ends (Rx AFEs) 252, a plurality of analog-to-digital converters (ADCs) 254, digital signal processing circuitry 256, data processing circuitry 264, bus controller circuitry 258, clock generation circuitry 260, and control and memory circuitry 262.

Each of the Rx AFEs 252 is operable to process a millimeter wave signal (e.g., in the band from 76 to 81 GHz) from a respective one of the plurality of antenna elements 208. The processing may comprise, for example, low noise amplification, filtering, and down-conversion so as to output a 1 to 5 GHz wide intermediate frequency or baseband signal.

Each of the ADCs 254 is operable to digitize the output of a corresponding one of the Rx AFEs 252. For example, each Rx AFE 252 may downconvert a received 76 to 77 GHz band to a 1 GHz wide baseband signal which the corresponding ADC 254 may then digitize to generate a 1 GHz wide digital signal. As another example, each Rx AFE 252 may downconvert a received 76 to 81 GHz band to a 5 GHz wide baseband signal which the corresponding ADC 254 may then digitize to generate a 5 GHz wide digital signal 255.

The digital signal processing circuitry 256 is operable to process the digitized signals from the plurality of ADCs 254 to recover information conveyed by the received signals. Such information may be conveyed by characteristics (e.g., latency, Doppler shift, signal strength, etc.) of the received signals, as is the case in a conventional radar system, and/or may be data that was modulated onto the received signals.

The processing performed by the digital signal processing circuit 256 may comprise, for example, channel estimation and equalization.

The processing performed by the digital signal processing circuit 256 may, where the millimeter wave signals are modulated by a data signal, comprise demodulation. For example, the millimeter wave signals transmitted by transceivers 102 may comprise bursts (or "chirps") whose amplitude is modulated relatively slowly as compared to the channel frequency (e.g., a few MHz as compared to a channel frequency of 76-81 GHz), and the digital signal processing circuitry 256 may be operable to track the signal envelope to recover the data signal. As another example, the millimeter wave signals transmitted by transceivers 102 may comprise OFDM symbols and the digital signal processing circuit 256 may be operable to demodulate the received signals using a discrete Fourier transform. The digital signal processing circuit 256 may then be operable to demap the modulated signal according to one or more symbol constellations, deinterleave the demapped bits, and decode the demapped bits. The recovered bits may then be provided to the control and memory subsystem 262 and/or output onto the bus 212.

The processing performed by the digital signal processing circuit 256 may comprise beamforming. The beamforming may comprise time-domain beamforming in which one or more sets of phase and amplitude coefficients is applied to each of the signals 255 in the time domain. Alternatively, or additionally, the beamforming may comprise frequency-domain beamforming in which the signals 255 are first transformed to the frequency domain (e.g., via a DFT) and then each subband (e.g., each OFDM bin or group of OFDM bins) is processed using a corresponding one or more beamforming matrices determined for that subband. In this manner, different subbands may be communicated on beams pointed in different directions.

The processing performed by the digital signal processing circuit 256 may comprise spectral analysis of the received signals. The spectral analysis may comprise, for example, mixing received signals with one or more reference signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected.).

The processing performed by the digital signal processing circuit 256 may comprise separating different transmitted signals (e.g., originating from different ones of the transceivers $102_1$-$102_8$). The processing may comprise, for example, correlating the received signals with different orthogonal codes and/or pseudorandom sequences used by different ones of the transceivers $102_1$-$102_8$. Alternatively, or additionally, separating different transmitted signals (e.g., to determine which transceiver 102 sent which signal) may comprise directly recovering a respective identifier (e.g., a unique identifier such as a MAC address or similar) modulated onto each of the millimeter wave signals. The ability to distinguish which, if any, energy arrived from each transceiver $102_1$-$102_8$ may be useful for performing the radar function, the positioning function, and the communication function of the transceivers 102. For the radar and positioning functions, for example, the identification of which of transceivers $102_1$-$102_8$ sent any particular received signal may be used for determining the position and angle from which the signal was transmitted (since the different transceivers $102_1$-$102_8$ are at different positions on the automobile 100), which may be used for determining precise distance to, and location of, objects in the scene. For the communication function, for example, the identification of which of transceivers $102_1$-$102_8$ sent any particular received signal may be used in a manner similar to a "from" address in many networking protocols.

The data processing circuitry 264 is operable to process data output by the digital signal processing circuitry 256. Such processing may comprise, for example, implementing algorithms to generate a representation of the scene detected using the radar function. Based on the angle, strength, timing, spectral content, and/or other characteristics of the received signals, the data processing circuitry 264 may generate a 2D pixel grid or 3D voxel grid. In an example implementation, each pixel or voxel may indicate an absolute position to which it corresponds (determined via the positioning function of the multifunction radar system), the strength of returns, if any, received from that location (determined via the radar function of the multifunction radar system), spectral content of returns, if any, received from that location, and/or time(s) at which returns were received from that location and/or at which the pixel or voxel data was updated.

The data processing circuitry 264 may also be operable to process data received from the data bus 212. For example, positioning information may be received via the bus 212 (e.g., GPS coordinates from a GPS receiver of the vehicle 100) and combined with data recovered from the digital processing circuitry 264 for performing the positioning function.

The processing (performed by data processing circuitry 264) of data output by digital signal processing circuitry 256 may comprise, for example, preparing data for output onto the data bus 212. For example, a scene representation generated from the output of the digital signal processing circuity 256 may be transmitted onto the data bus 212.

The bus controller circuitry 258 may be substantially similar to the bus controller 206 described above.

The clock generation circuitry 260 is operable to generate a plurality of timing signals that are synchronized to the timing signal received via bus 216. The timing signals may comprise, for example: a local oscillator signal for direct downconversion of received millimeter wave signals (e.g., in the 76 to 81 GHz range), a sampling clock for the ADCs 254 (e.g., between 2 and 20 GHz), and one or more clocks for clocking the digital processing circuitry 256, the bus controller 258, and the control and memory subsystem 262.

The control portion of subsystem 262 is operable to manage operations of the receiver SoC $202_n$ (e.g., implement a state machine and/or other control logic that controls the configuration of the other components of the receive SoC $202_n$). The control portion of subsystem 262 may, for example, configure beamforming matrices used by the digital signal processing circuitry 256. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications from other transceivers 102 that are likely to come from that direction. Directions of interest may be determined based on, for example, data received via the data bus, data carried in previously received millimeter wave signals, and/or previously generated scene representations.

The memory portion of subsystem 262 is operable to store relatively large amounts (e.g., hundreds of megabits) of information of a variety of forms. For example, beamforming matrices, an identifier of the transceiver 102, scrambling codes, and messages received from (via data bus 212) and/or to be communicated to (via data bus 212 and/or via millimeter wave signals) other transceivers are just some examples of the information which may be stored in the memory and readily accessible to the SoC $202_n$.

Figure 2C:
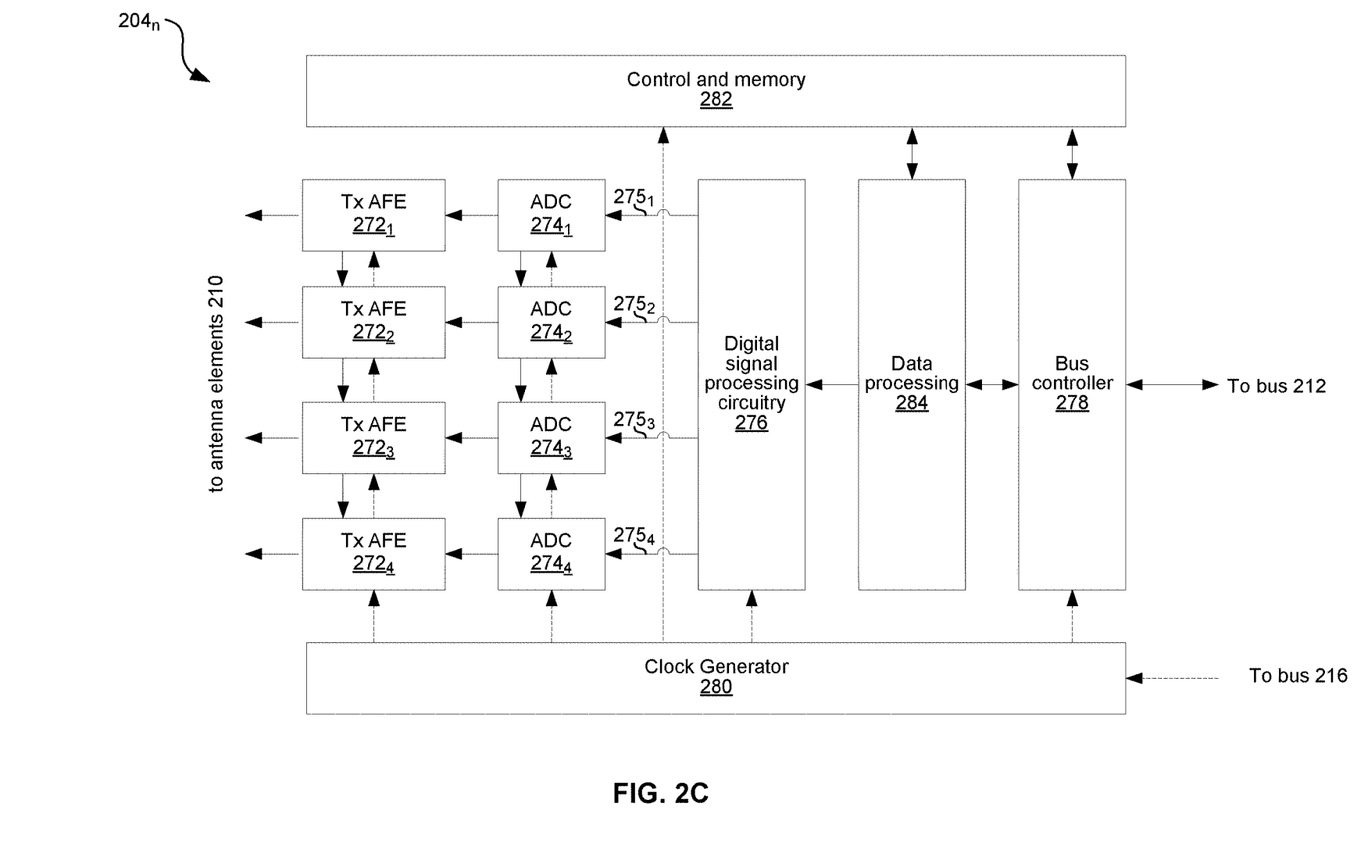
FIG. 2C shows an example implementation of a transmitter system on chip (SoC) of a multifunctional radar transceiver of FIG. 2A.

FIG. 2C shows an example implementation of a transmitter system on chip (SoC) of the multifunctional radar transceiver of FIG. 2A. The example transmit SoC 204, comprises a plurality of transmit analog front ends (Tx AFEs) 272, a plurality of analog-to-digital converters (ADCs) 274, digital signal processing circuitry 276, data processing circuitry 284, bus controller circuitry 278, clock generation circuit 280, and control and memory subsystem 282.

Each of the Tx AFEs 272 is operable to receive an analog baseband signal from a respective one of ADCs 274, upconvert the signal to a millimeter wave (e.g., a 1 GHz to 5 GHz wide signal in the band from 76 to 81 GHz), and amplify the millimeter wave signal for output to a respective one of antenna elements $210_1$-$210_4$.

Each of the ADCs 274 is operable to convert a digital signal 275 from the digital signal processing circuitry 276 to an analog representation. For example, each signal 275 may be a 1 GHz to 5 GHz wide baseband signal.

The digital signal processing circuitry 276 is operable to process one or more data streams from data processing circuitry 284 to generate a plurality (four in the example shown) of digital baseband signals 275. Processing performed by digital signal processing circuitry 276 may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The processing performed by the digital signal processing circuit 276 may comprise generating modulated signals $275_1$-$275_4$ and/or generating a data signal to be modulated onto a carrier. As an example of the former case, the digital signal processing circuit 276 may output a continuous wave signal, or a chirp whose amplitude is modulated by a data signal whose frequency is relatively low (e.g., a few MHz) as compared to the channel frequency (e.g., between 76 GHz and 81 GHz). As another example of the former case, the digital signal processing circuit 276 may output an OFDM signal. As an example of the latter case, the digital signal processing circuit 276 may output a relatively low bandwidth data signal (e.g., a few MHz) which may modulate a millimeter wave chirp generated by the clock generator 280.

The processing performed by the digital signal processing circuit 276 may comprise beamforming. The beamforming may comprise time-domain beamforming and/or frequency-domain beamforming.

Data processing circuit 284 is operable to generate one or more data signals for modulation onto the millimeter wave signals transmitted by the SoC $204_n$. The datastreams may, for example, be read from memory of the SoC $202_n$ (e.g., an identifier of the module $102n$) and/or generated algorithmically (e.g., timestamps generated based on a clock of the control portion of subsystem 282). Additionally, or alternatively, the data may be received from bus 212 via bus controller 278. The data processing circuit 284 may packetize and/or otherwise format the data.

Bus controller 278 may be substantially similar to the bus controller 206 described above.

Clock generation circuit 280 is operable to generate a plurality of timing signals that are synchronized to the timing signal received via bus 216. The timing signals may comprise, for example: a local oscillator signal for upconversion of baseband signals to millimeter wave signals (e.g., in the 76 to 81 GHz range), a sampling clock for the DACs 274 (e.g., between 2 and 20 GHz), and one or more clocks for clocking the digital processing circuitry 276, the bus controller 278, and the control and memory subsystem 282.

The control portion of subsystem 282 is operable to manage operations of the receiver SoC $204_n$ (e.g., implement a state machine and/or other control logic that controls the configuration of the other components of the receive SoC $204_n$). The control portion of subsystem 282 may, for example, configure beamforming matrices used by the digital signal processing circuitry 276. For example, the control portion of subsystem 282 may determine that particular directions are of interest at a given time and may configure the beamforming to point beams in those particular directions. Particular directions may be of interest because, for example, it may be desirable to determine more information about objects located in that direction and/or to listen for communications from other transceivers 102 that are likely to come from that direction. Directions of interest may be determined based on, for example, data received via the data bus 212, scene scanning algorithms, and/or the like.

The memory portion of subsystem 282 is operable to store relatively large amounts (e.g., hundreds of megabits) of information of a variety of forms. For example, beamforming matrices, and messages received from (via data bus 212 and/or millimeter wave signals) and/or to be communicated to (via data bus 212 and/or modulated onto millimeter wave radar signals) other transceivers are just some examples of the information which may be stored in the memory and readily-accessible to the SoC $204n$.

Figure 3A:
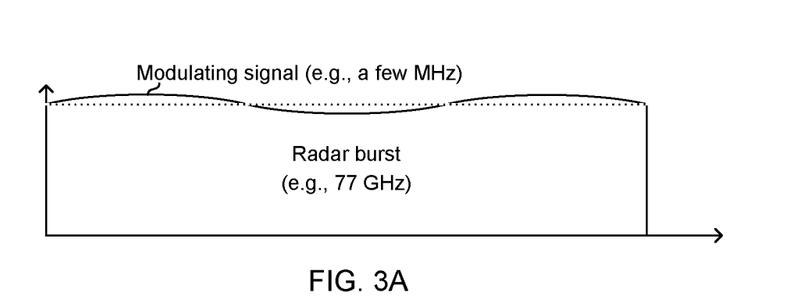
FIGS. 3A and 3B show two example signal formats used by a multifunctional radar transceiver.
Figure 3B:
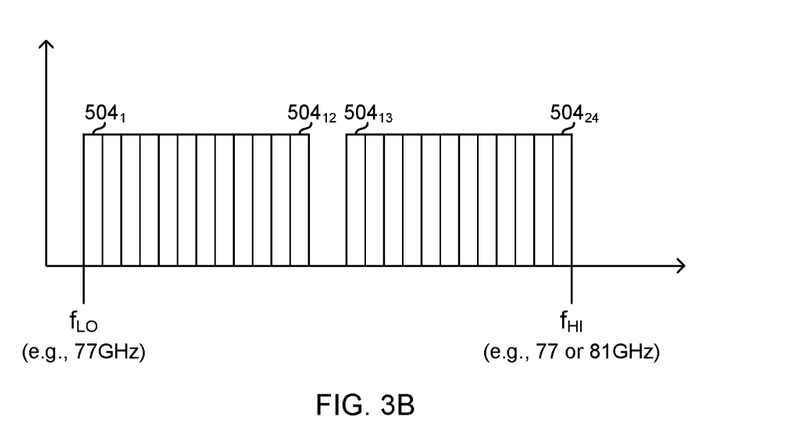

FIGS. 3A and 3B show two example signal formats used by a multifunctional radar transceiver. In FIG. 3A, the millimeter wave signal (e.g., a continuous wave signal or series of frequency ramped "chirps") is amplitude modulated by a relatively slowly varying data signal. In FIG. 3B the millimeter wave signal is an OFDM signal which, for any given burst (frame) may transmit one or more of a plurality of subbands 504 (twenty-four subbands were chosen arbitrarily for illustration, any number may be used). Each of the subbands $504_1$-$504_{24}$ may be a continuous wave or may be modulated by a data signal (e.g., a N-QAM symbol corresponding to $\log_2(N)$ bits of the data signal). Different subbands and/or groups of subbands may be allocated for different purposes (e.g., some for radar, some for positioning, and some for communication). Similarly, using frequency-domain beamforming, different subbands and/or groups of subbands may be pointed in different directions for detecting objects at different locations in the scene and/or for transmitting the data signal in directions (e.g., pointed at different reflection paths leading to different ones of the transceivers $102_1$-$102_8$).

Data modulated onto the millimeter wave signal may be forward error correction encoded for robustness. Data modulated onto the millimeter wave signal may be scrambled or encrypted for security (e.g., to prevent spoofing, sniffing of communications, etc.).

Figure 4:
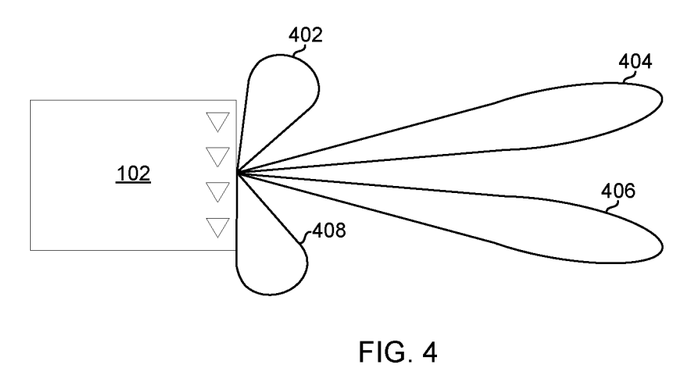
FIG. 4 shows an example antenna pattern of the multifunctional radar transceiver of FIG. 2

FIG. 4 shows an example antenna pattern of the multifunctional radar transceiver of FIG. 2. For example, for the radar function, lobes 402 and 408 may be used for identifying objects that are relatively close and off to the side of the transceiver $102_n$, and the lobes 404 and 406 may be used for looking further in the distance (e.g., in the direction of travel of the automobile 100 or looking behind the automobile 100). As another example, for the radar function, the lobes 402 and 408 may receive returns from the nearby road surface and the Doppler of such returns may be used for calculating the speed of the automobile 100. As another example, for the communication function, lobes 402 and 408 may be used for directly communicating with another transceiver 102 off to the side of the depicted transceiver $102_n$ and lobes 404 and 406 may be used for communicating with other transceivers by bouncing the signals off of objects in the scene.

Although four beams/lobes are shown for illustration, the multifunctional radar transceivers are not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers with which it is necessary or desirable to communicate at any given time. Similarly, the directions of the beams may vary over time. For example, the directionality of any one or more of the beams 402, 404, 406, and 408 may change periodically, based on what is detected in the scene, based on desired communication to be sent or received, and/or the like.

Figure 5:
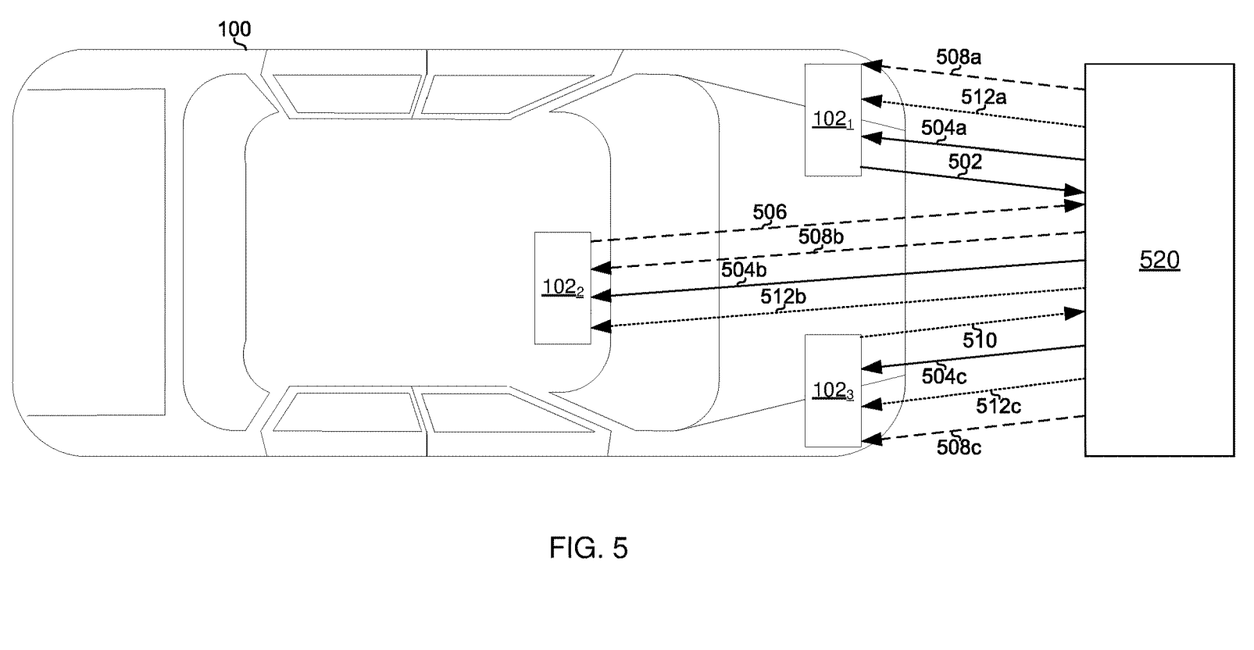
FIG. 5 shows example multifunctional radar signals communicated among a plurality of radar transceivers of an automobile.
Figure 6:
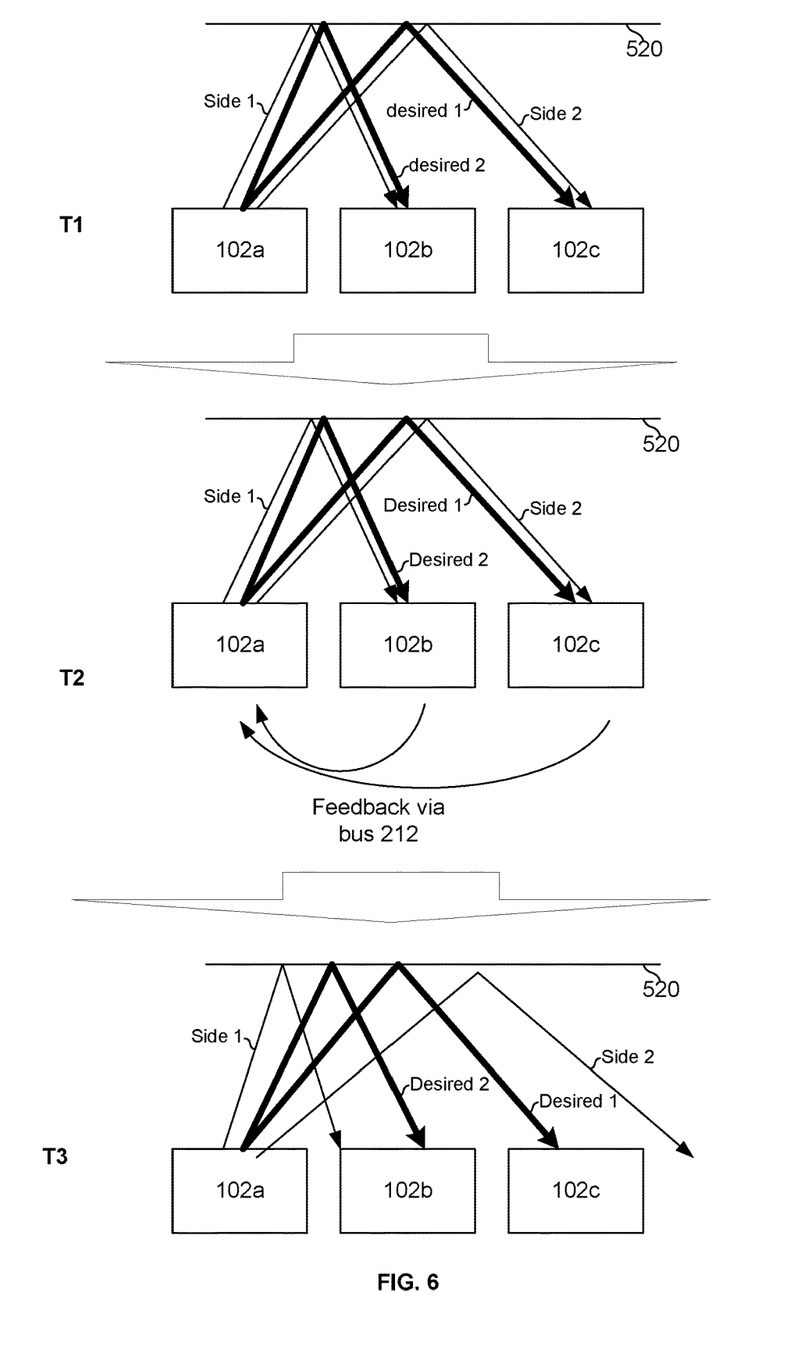
FIG. 6 illustrates an example calibration technique for reducing interference among multifunction radar transceivers.
Figure 7A:
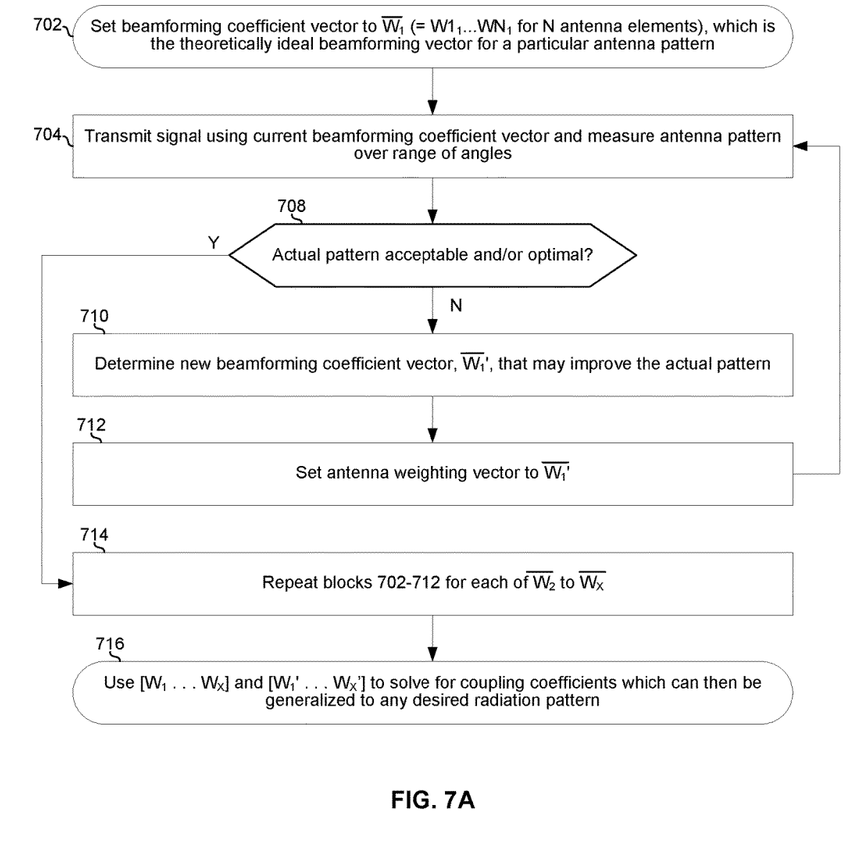
FIGS. 7A and 7B illustrate another example calibration technique for reducing interference among multifunction radar transceivers.
Figure 7B:
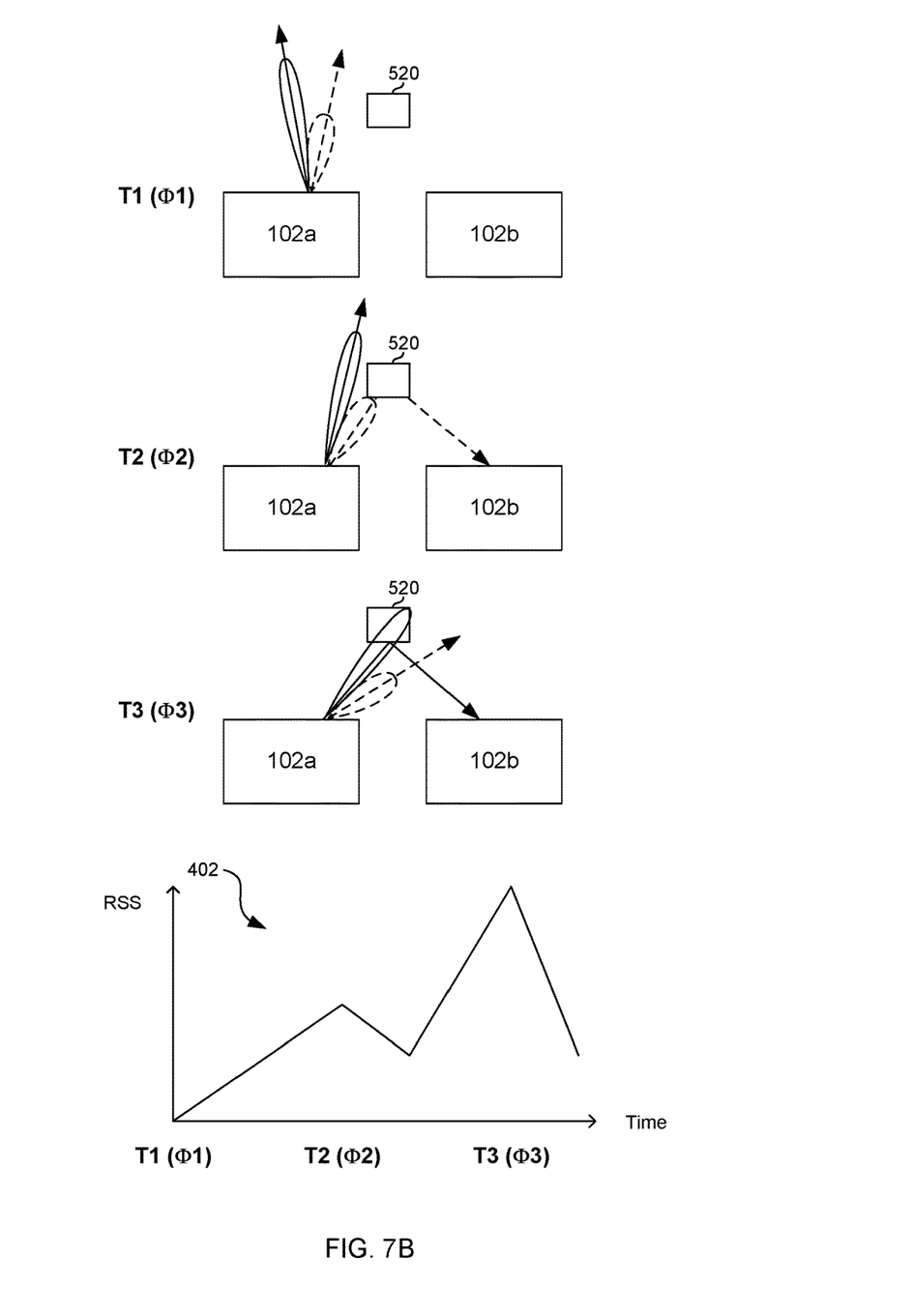

FIG. 5 shows example multifunctional radar signals communicated among a plurality of radar transceivers of an automobile. The transceiver 102$_1$ transmits millimeter wave signal 502 which reflects off of object 520 (e.g., the car in front of the automobile 100) and is then incident on transceiver 102$_1$ as signal 504*a*, incident on transceiver 102$_2$ as signal 504*b*, and incident on transceiver 102$_3$ as signal 504*c*. The transceiver 102$_2$ transmits millimeter wave signal 506 which reflects off of object 520 and is then incident on transceiver 102$_1$ as signal 508*a*, incident on transceiver 102$_2$ as signal 508*b*, and incident on transceiver 102$_3$ as signal 508*c*. The transceiver 102$_3$ transmits signal 510 which reflects off of object 520 and is then incident on transceiver 102$_1$ as signal 512*a*, incident on transceiver 102$_2$ as signal 512*b*, and incident on transceiver 102$_3$ as signal 512*c*. In some instances, each of the reflections 504*a*-504*c*, 508*a*-508*c*, and 512*a*-512*c* may be desired for performing at least one of the radar, positioning, and communications functions. In other instances, however, one or more of the signals 504*a*-504*c*, 508*a*-508*c*, and 512*a*-512*c* may be the result of an undesired side lobe, in which case it represents interference that negatively affects operation of the multifunctional radar system of automobile 100. FIGS. 6, 7A and 7B illustrate methods and systems for reducing such interference.

Now referring to FIG. 6, shown again are three multifunction radar transceivers 102$_1$-102$_3$. At time T1, 102*a* transmits using an antenna pattern having desired lobes 1 and 2 that point (via reflection off of object 520) at transceivers 102*c* and 102*b*, respectively. An unintended consequence of this transmission, however, is side lobes 1 and 2 which point (via reflection off of object 520) at transceivers 102*b* and 102*c* respectively. The transceivers 102*b* and 102*c* detect these interfering signals and determine that they are originating from transceiver 102*a* (e.g., using techniques such as described above). Accordingly, at time T2 they report the problematic signals to the transceiver 102 via data bus 212. In response, at time T3, the transceiver 102*a* alters its beamforming coefficients such that the power incident on transceivers 102*b* and 102*c* from the side lobes drops. In an example implementation, this may be an iterative process with transceiver 102*a* repeatedly adjusting its beamforming coefficients and the transceivers 102*b* and 102*c* reporting back the results (e.g., reporting whether each change of beamforming coefficients made the interference better or worse). A least mean squares or some other optimization algorithm may be used for converging on the best beamforming coefficients. Once suitable beamforming coefficients are found, they may be stored in a lookup table for future use. This adjustment of the beamforming pattern shown in FIG. 6 may be performed, for example, during a calibration on the multifunction radar system on the assembly line in the automobile factory. Since the angle for reflecting between transceivers depends on the distance of the object off of which the signals are reflected, such a calibration may be performed for multiple distances to the object 520. Interpolation may be used for distances in between calibration distances. Similar calibration may be carried out for the receiver of transmitter 102*a* and for both transmitters and receivers of transceivers 102*b* and 102*c*.

FIGS. 7A and 7B illustrate another example calibration technique for reducing interference among multifunction radar transceivers. Assuming N (an integer) transmit antenna elements 210$_1$ to 210$_N$, and a corresponding N complex beamforming coefficients W1 . . . WN, the beamforming coefficient vector that ideally would result in a first particular antenna pattern is denoted as $\overline{W_1}$=[W1$_1$ . . . WN$_1$]. In block 702, the beamforming coefficients in transceiver 102*a* (as an arbitrarily chosen example) are set to $\overline{W_1}$. Due to coupling between the antenna elements, however, $\overline{W_1}$ will result in an actual antenna pattern different than the ideal first particular antenna pattern.

In block 704, the transceiver 102 transmits a signal using the currently set beamforming coefficient vector (i.e., $\overline{W_1}$ in a first pass through blocks 704-712 of FIG. 7A, $\overline{W_1}'$ in a second pass blocks 704-712 of FIG. 7A, and so on). During transmission, the transmitted signal strength is measured over a range of angles (e.g., 180°). A first method for the measurement over the range of angles is to mechanically sweep a receiver around the transmitter or the transmitter around a receiver. This first method may be suitable for a factory calibration. A second method comprises electronically sweeping the absolute angle of the overall antenna pattern resulting from $\overline{W_1}$ while maintaining the relative angles and amplitudes of the lobes of the antenna pattern resulting from $\overline{W_1}$. This may be achieved, for example, by combining $\overline{W_1}$ with a second, dynamic beamforming coefficient vector $\overline{\Phi}$ that sweeps the range of angles over a period of time (possibly resting on each angle for a period of time to allow sufficient integration of received signal energy). This second method of calibration may enable measuring the antenna pattern with the transceivers 102*a* itself and/or one or more of the other transceivers 102 of the automobile 100. Ample amounts of integration/averaging may be used with this second method to ensure reliable results. Similarly, reflecting the signals off of an object 520 that is close and static may also improve the results.

Referring briefly to FIG. 7B, an implementation in which the receiver of transceiver 102*b* measures the actual antenna pattern of transceiver 102*a* is shown. At time T1, the antenna pattern is at angle Φ1 and no energy is reflected off of object 520 to transceiver 102*b*. Thus, on the graph 402 the received signal strength (RSS) at time T1 is 0. Between times T1 and T2, the antenna pattern rotates from angle Φ1 to Φ2 and energy from the first lobe (indicated by the dashed lines) begins to be received by transceiver 102*b* until it peaks at time T2. Between time T2 and T3 the antenna pattern rotates from angle Φ2 to Φ3 and energy received by the transceiver 102*b* at first decreases and then begins to increase as energy from the second lobe (solid lines) begins to be received until reaching a peak at time T3. Thus the antenna pattern measured by transceiver 102*b* (represented by the graph 402) indicates the relative amplitudes and phases between the two lobes of the antenna pattern. The transceiver 102*b* may then communicate this information to the transceiver 102*a* such that the transceiver 102*a* may alter its beamforming coefficient vector to adjust the antenna pattern as desired.

In block 708, the measured antenna pattern is analyzed to determine whether it is acceptable (e.g., side lobes below some threshold) and/or optimal (e.g., side lobes levels as low as can be obtained.) If not, then the process advances to block 710.

In block 710, the system determines a new beamforming coefficient vector, denoted $\overline{W_1}'$, that is predicted to improve the actual pattern (e.g., reduce sidelobe levels and/or place them at different relative angles, etc.).

In block 712, the beamforming coefficients of transceiver 102*a* are set to $\overline{W_1}'$ and the process then returns to block 704. In this manner an iterative optimization may be performed using a least mean squares or similar optimization algorithm.

Returning to block 708, once a suitable and/or optimal value of $\overline{W_1}'$ is found, the process advances to block 714 in which the blocks 702-712 are repeated for beamforming coefficients $\overline{W_2}$ to $\overline{W_X}$ to find $\overline{W_2}'$ to $\overline{W_X}'$, where X is an integer determined by the number of unknowns in the following equation $$[W1 \ W2 \ \ldots \ WN] \begin{bmatrix} C_{11} & \ldots & C_{1N} \\ \vdots & \ddots & \vdots \\ C_{N1} & \ldots & C_{NN} \end{bmatrix} = [W1' \ W2' \ \ldots \ WN'],$$

and where the matrix $\overline{C}$ characterizes the coupling between the N antenna elements.

In block 716, $\overline{W_1}$ to $\overline{W_X}$ to find $\overline{W_1}'$ to $\overline{W_X}'$ are used to solve for the coupling matrix $\overline{C}$. Once $\overline{C}$ is known, the actual beamforming coefficients needed for any desired arbitrary antenna pattern P can be readily determined from $\overline{W_P}$ (which, being the theoretical beamforming coefficient vector for antenna pattern P, can be determined mathematically) and $\overline{C}$.

In accordance with an example implementation of this disclosure, a multifunctional radar transmitter comprises bus interface circuitry (e.g., 278) and beamforming circuitry (e.g., part of 276). The beamforming circuitry, with use of a plurality of beamforming coefficients, is operable to process a plurality of baseband signals to generate a millimeter wave radar burst corresponding to a radiation pattern that comprises a first lobe (e.g., "desired 1" of FIG. 6) and a second lobe (e.g., "side 1" of FIG. 6), wherein the first lobe is at a first angle, and the second lobe is at a second angle. The bus interface circuitry is operable to receive (e.g., via 212), from a first receiver, an indication of interference from the second lobe present at the first receiver. The beamforming circuitry is operable to adjust, based on the indication of interference, the beamforming coefficients such that the second lobe is redirected to a third angle. The multifunctional radar transmitter may comprise signal processing circuitry (e.g., part of 276) operable to receive a first datastream intended for the first receiver, and process the first datastream to generate the plurality of baseband signals (e.g., signals 275₁-275₄). The processing of the first datastream may comprise performance of one or more of: forward error correction encoding, bit-to-symbol mapping, frequency mapping, and an inverse Fourier transform. The signal processing circuitry may be operable to: receive a second datastream intended for the first receiver, and process the second datastream to generate the plurality of baseband signals. Energy corresponding to the first datastream may predominate on the first lobe, and energy corresponding to the second datastream may predominate on the second lobe. The multifunctional radar transmitter may comprise front-end circuitry (e.g., 272₁-272₄) operable to modulate an output of the beamforming circuitry onto one or more millimeter wave carrier signals to generate a plurality of modulated millimeter wave signals corresponding to the millimeter wave radar burst. The indication of interference may be a representation of received signal strength of energy from the second lobe. The beamforming circuitry is operable to cycle through a plurality of settings of the beamforming coefficients during a calibration interval such that the first lobe and second lobe sweep over a range of angles during the calibration interval. The system may comprise the first receiver, which may be operable to separate a first received signal corresponding to the first lobe and a second received signal corresponding to the second lobe. The first receiver may comprise signal processing circuitry (e.g., 256) operable to process the first received signal to determine a speed and/or location of an object off of which the first received signal reflected, and demodulate the first received signal to recover information modulated on the first received signal.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A system comprising:
a multifunctional radar transmitter that comprises bus interface circuitry and beamforming circuitry, wherein:
the beamforming circuitry, with use of a plurality of beamforming coefficients, is operable to process a plurality of baseband signals to generate a millimeter wave radar burst corresponding to a radiation pattern that comprises a first lobe and a second lobe, wherein the first lobe is at a first angle intended for a first receiver and the second lobe is at a second angle intended to be transmitted away from the first receiver;
the bus interface circuitry is operable to receive, from the first receiver, an indication of interference from the second lobe present at the first receiver; and
the beamforming circuitry is operable to adjust, based on the indication of interference, the beamforming coefficients such that the second lobe is redirected away from the first receiver to a third angle.

2. The system of claim 1, wherein the multifunctional radar transmitter comprises signal processing circuitry operable to:
receive a first datastream intended for the first receiver; and
process the first datastream to generate the plurality of baseband signals.

3. The system of claim 2, wherein the processing of the first datastream comprises performance of one or more of: forward error correction encoding, bit-to-symbol mapping, frequency mapping, and an inverse Fourier transform.

4. The system of claim 2, wherein the signal processing circuitry is operable to:
receive a second datastream intended for the first receiver; and
process the second datastream to generate the plurality of baseband signals.

5. The system of claim 4, wherein:
energy corresponding to the first datastream predominates on the first lobe; and
energy corresponding to the second datastream predominates on the second lobe.

6. The system of claim 1, wherein the multifunctional radar transmitter comprises front-end circuitry operable to modulate an output of the beamforming circuitry onto one or more millimeter wave carrier signals to generate a plurality of modulated millimeter wave signals corresponding to the millimeter wave radar burst.

7. The system of claim 1, wherein the indication of interference is a representation of received signal strength of energy from the second lobe.

8. The system of claim 1, wherein the beamforming circuitry is operable to cycle through a plurality of settings of the beamforming coefficients during a calibration interval such that the first lobe and second lobe sweep over a range of angles during the calibration interval.

9. The system of claim 1, wherein the first receiver is operable to separate a first received signal corresponding to the first lobe and a second received signal corresponding to the second lobe.

10. The system of claim 9, wherein the first receiver comprises signal processing circuitry operable to:
process the first received signal to determine a speed and/or location of an object off of which the first received signal reflected; and
demodulate the first received signal to recover information modulated on the first received signal.

11. A method comprising:
processing, by beamforming circuitry of a multifunctional radar transmitter using a plurality of beamforming coefficients, a plurality of baseband signals to generate a millimeter wave radar burst corresponding to a radiation pattern that comprises a first lobe and a second lobe, wherein the first lobe is at a first angle intended for a first receiver and the second lobe is at a second angle intended to be transmitted away from the first receiver;
receiving, from the first receiver by bus interface circuitry of the multifunctional radar transmitter, an indication of interference from the second lobe present at the first receiver; and
adjusting, by the beamforming circuitry based on the indication of interference, the beamforming coefficients such that the second lobe is redirected away from the first receiver to a third angle.

12. The method of claim 11, comprising:
receiving, by signal processing circuitry of the multifunctional radar transmitter, a first datastream intended for the first receiver; and
processing, by the signal processing circuitry, the first datastream to generate the plurality of baseband signals.

13. The method of claim 12, wherein the processing of the first datastream comprises performing one or more of: forward error correction encoding, bit-to-symbol mapping, frequency mapping, and an inverse Fourier transform.

14. The method of claim 12, comprising:
receiving, by the signal processing circuitry, a second datastream intended for the first receiver; and
processing, by the signal processing circuitry, the second datastream to generate the plurality of baseband signals.

15. The method of claim 14, wherein:
energy corresponding to the first datastream predominates on the first lobe; and
energy corresponding to the second datastream predominates on the second lobe.

16. The method of claim 11, comprising modulating, by front-end circuitry of the multifunctional radar transmitter, an output of the beamforming circuitry onto one or more millimeter wave carrier signals to generate a plurality of modulated millimeter wave signals corresponding to the millimeter wave radar burst.

17. The method of claim 11, wherein the indication of interference is a representation of received signal strength of energy from the second lobe.

18. The method of claim 11, comprising cycling, by the beamforming circuitry, through a plurality of settings of the beamforming coefficients during a calibration interval such that the first lobe and second lobe sweep over a range of angles during the calibration interval.

19. The method of claim 11, comprising separating, by the first receiver, a first received signal corresponding to the first lobe and a second received signal corresponding to the second lobe.

20. The method of claim 19, comprising:
processing, by signal processing circuitry of the first receiver, the first received signal to determine a speed and/or location of an object off of which the first received signal reflected; and
demodulating, by the signal processing circuitry, the first received signal to recover information modulated on the first received signal.

\* \* \* \* \*